(12) United States Patent
Kang et al.

(10) Patent No.: US 9,939,616 B2
(45) Date of Patent: Apr. 10, 2018

(54) WIDE ANGLE LENS SYSTEM AND IMAGING DEVICE HAVING THE SAME

(71) Applicant: KOLEN CO., LTD., Gyeonggi-do (KR)

(72) Inventors: Chan Goo Kang, Gyeonggi-do (KR); Jong Jin Lee, Seoul (KR); Seong Hee Bae, Gyeonggi-do (KR)

(73) Assignee: KOLEN CO., LTD., Gyeonggi-do (KR)

( * ) Notice: Subject to any disclaimer, the term of this patent is extended or adjusted under 35 U.S.C. 154(b) by 0 days.

(21) Appl. No.: 15/222,578

(22) Filed: Jul. 28, 2016

(65) Prior Publication Data

US 2017/0322391 A1   Nov. 9, 2017

(30) Foreign Application Priority Data

May 4, 2016   (KR) .................. 10-2016-0055767

(51) Int. Cl.
  *G02B 13/18*   (2006.01)
  *G02B 3/02*   (2006.01)
  *G02B 13/00*   (2006.01)
  *G02B 9/62*   (2006.01)
  *G02B 27/00*   (2006.01)

(52) U.S. Cl.
  CPC ........... *G02B 13/0045* (2013.01); *G02B 9/62* (2013.01); *G02B 27/0025* (2013.01)

(58) Field of Classification Search
  CPC ... G02B 13/0045; G02B 27/0025; G02B 9/62
  See application file for complete search history.

(56) References Cited

U.S. PATENT DOCUMENTS

| 2015/0177483 | A1* | 6/2015 | You ................... G02B 13/0045 359/757 |
| 2015/0301312 | A1* | 10/2015 | Chen ..................... G02B 7/021 348/340 |
| 2016/0109688 | A1 | 4/2016 | Jo |

FOREIGN PATENT DOCUMENTS

| KR | 10-2015-0021430 A | 3/2015 |
| KR | 10-2016-0046255 A | 4/2016 |

OTHER PUBLICATIONS

Korean Office Action dated May 22, 2017, issued in corresponding Korean Patent Application No. 10-2016-0055767. (7 pages).

* cited by examiner

*Primary Examiner* — Alicia M Harrington
(74) *Attorney, Agent, or Firm* — Fitch Even Tabin & Flannery LLP (57) ABSTRACT

A wide angle lens system, from an object side to an image plane side, includes: a first lens having a positive refractive power; a second lens having a positive refractive power and an exit surface that is convex toward the image plane side; a third lens having a negative refractive power and an exit surface that is concave toward the image plane side; a fourth lens having a positive refractive power and an exit surface that is convex toward the image plane side; a fifth lens having a negative refractive power and an exit surface that is concave toward the image plane side; and a sixth lens having a positive refractive power. The wide angle lens system satisfies the following formulas:

75<FOV<85

2.0<Fno<2.3 where FOV is a field of view of the wide angle lens system in degrees (°) and Fno is an F-number of the wide angle lens system.

19 Claims, 9 Drawing Sheets

WIDE ANGLE LENS SYSTEM AND IMAGING DEVICE HAVING THE SAME

CROSS-REFERENCE TO RELATED APPLICATION

This application claims the benefit of Korean Patent Application No. 10-2016-0055767, filed on May 4, 2016, in the Korean Intellectual Property Office, the disclosure of which is incorporated herein in its entirety by reference.

BACKGROUND

1. Field

One or more embodiments relate to a wide angle lens system and an imaging device including the wide angle lens system.

2. Description of the Related Art

Imaging devices including solid-state imaging elements such as charge-coupled device (CCD) image sensors or complementary metal-oxide semiconductor (CMOS) image sensors are widely used. Imaging devices using solid-state imaging elements, such as digital cameras, systems having interchangeable lenses, or video cameras, are required to have high-resolution and high-quality characteristics. Since imaging devices including solid-state imaging elements are small, recent small information terminals such as cellular phones employ such imaging devices.

Wide angle lens systems are required to have high resolution to cope with high-pixel digital cameras and are increasingly required to have a compact shape for high portability.

SUMMARY

One or more embodiments include a wide angle lens system having a small size and an imaging device including the wide angle lens system.

Additional aspects will be set forth in part in the description which follows and, in part, will be apparent from the description, or may be learned by practice of the presented embodiments.

According to one or more embodiments, a wide angle lens system, from an object side to an image plane side, includes: a first lens having a positive refractive power; a second lens having a positive refractive power and an exit surface that is convex toward the image plane side; a third lens having a negative refractive power and an exit surface that is concave toward the image plane side; a fourth lens having a positive refractive power and an exit surface that is convex toward the image plane side; a fifth lens having a negative refractive power and an exit surface that is concave toward the image plane side; and a sixth lens having a positive refractive power, wherein the wide angle lens system satisfies Formulas 1 and 2 below:

$$75<FOV<85 \quad \text{Formula 1}$$

$$2.0<Fno<2.3 \quad \text{Formula 2}$$

where FOV refers to a field of view of the wide angle lens system in degrees (°) and Fno refers to an F-number of the wide angle lens system.

The fourth lens may have a meniscus shape that is convex toward the image plane side.

At least one of an entrance surface and an exit surface of the sixth lens may have at least one inflection point.

The wide angle lens system may satisfy Formula 3 below:

$$0.6<TTL/ImgH<0.8 \quad \text{Formula 3}$$

where TTL refers to a distance in millimeters (mm) from a center of an entrance surface of the first lens to an image plane, and ImgH refers to a diagonal length of an effective pixel region in millimeters (mm).

The wide angle lens system may satisfy Formula 4 below:

$$0.5<F/ImgH<0.6 \quad \text{Formula 4}$$

where F refers to an effective focal length of the wide angle lens system in millimeters (mm), and ImgH refers to a diagonal length of an effective pixel region in millimeters (mm).

The wide angle lens system may satisfy Formula 5 below:

$$0.3<D1/D6<0.4 \quad \text{Formula 5}$$

where D1 refers to an effective diameter of the first lens in millimeters (mm) and D6 refers to an effective diameter of the sixth lens in millimeters (mm).

The wide angle lens system may satisfy Formula 6 below:

$$5<f5/f3<15 \quad \text{Formula 6}$$

where f5 refers to a focal length of the fifth lens in millimeters (mm) and f3 refers to a focal length of the third lens in millimeters (mm).

The wide angle lens system may satisfy Formula 7 below:

$$1.5<(Ind3+Ind4)/2<1.7 \quad \text{Formula 7}$$

where Ind3 refers to a refractive index of the third lens and Ind4 refers to a refractive index of the fourth lens.

The first lens may include a meniscus lens that is concave toward the image plane side.

The second lens may include a biconvex lens, and an absolute value of a radius of curvature of an entrance surface of the second lens may be less than an absolute value of a radius of curvature of the exit surface of the second lens.

The wide angle lens system may further include an aperture stop provided at a side of the first lens facing the object side.

The wide angle lens system may further include an optical filter at a side of the sixth lens facing the image plane side.

The first to sixth lenses may be aspherical lenses.

The first to sixth lenses may be plastic lenses.

According to one or more embodiments, a wide angle lens system, from an object side to an image plane side, includes: a first lens having a positive refractive power and an exit surface that is concave toward the image plane side; a second lens having a positive refractive power and an exit surface that is convex toward the image plane side; a third lens having a negative refractive power and an exit surface that is concave toward the image plane side; a fourth lens having a positive refractive power, the fourth lens being an meniscus lens having an exit surface that is convex toward the image plane side; a fifth lens having a negative refractive power and an exit surface that is concave toward the image plane side; and a sixth lens having a positive refractive power and an exit surface with at least one inflection point.

The wide angle lens system may further include an aperture stop at a side of the first lens facing the object side.

The wide angle lens system may satisfy Formulas 1 and 2 below:

$$75 < FOV < 85 \quad \text{Formula 1}$$

$$2.0 < Fno < 2.3 \quad \text{Formula 2}$$

where FOV refers to a field of view of the wide angle lens system in degrees)(° and Fno refers to an F-number of the wide angle lens system.

The wide angle lens system may satisfy at least one of Formulas 3 to 7 below:

$$0.6 < TTL/ImgH < 0.8 \quad \text{Formula 3}$$

$$0.5 < F/ImgH < 0.6 \quad \text{Formula 4}$$

$$0.3 < D1/D6 < 0.4 \quad \text{Formula 5}$$

$$5 < f5/f3 < 15 \quad \text{Formula 6}$$

$$1.5 < (Ind3 + Ind4)/2 < 1.7 \quad \text{Formula 7}$$

where TTL refers to a distance in millimeters (mm) from a center of an entrance surface of the first lens to an image plane, ImgH refers to a diagonal length of an effective pixel region in millimeters (mm), F refers to an effective focal length of the wide angle lens system in millimeters (mm), D1 refers to an effective diameter of the first lens in millimeters (mm), D6 refers to an effective diameter of the sixth lens in millimeters (mm), f5 refers to a focal length of the fifth lens, f3 refers to a focal length of the third lens, Ind3 refers to a refractive index of the third lens, and Ind4 refers to a refractive index of the fourth lens.

The first lens may include a meniscus lens that is concave toward the image plane side.

According to one or more embodiments, an imaging device includes: the wide angle lens system; and a solid-state imaging element configured to pick up an image formed by the wide angle lens system.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

Hereinafter, wide angle lens systems and imaging devices will be described with reference to the accompanying drawings according to embodiments. In the drawings, like reference numerals refer to like (or similar) elements.

In the following description, the term "image plane IP" may refer to a plane on which images are formed by light passing through a wide angle lens system, and the term "image plane (IP) side" may refer to a side at which an imaging device such as an image sensor is located or a direction toward the side. The term "object (OBJ) side" may refer to a side opposite an image plane side based on a wide angle lens system. In addition, a surface of a lens facing an object side may be referred to as an entrance surface, and the other surface of the lens facing an image plane side may be referred to as an exit surface.

Figure 1:
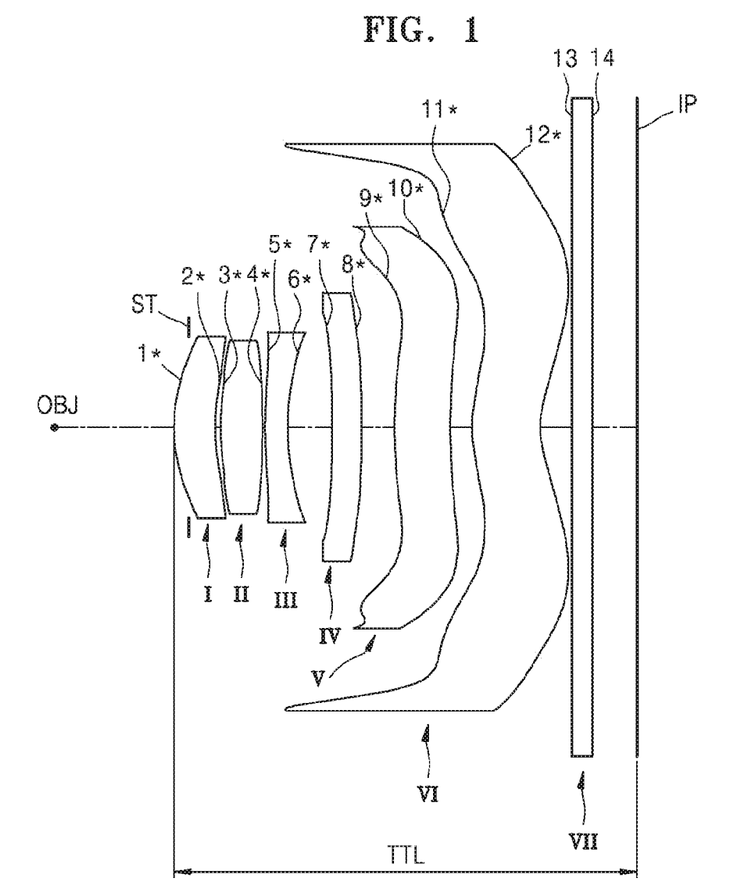
FIG. 1 is a schematic cross-sectional view illustrating an arrangement of elements of a wide angle lens system according to a first numerical embodiment.

FIG. 1 is a schematic cross-sectional view illustrating an arrangement of elements of a wide angle lens system according to a first numerical embodiment.

The wide angle lens system includes an aperture stop ST and first to sixth lenses I to VI sequentially arranged in a direction from an object (OBJ) side to an image plane (IP) side. For example, the first lens I may have a positive refractive power, the second lens II may have a positive refractive power, the third lens III may have a negative refractive power, the fourth lens IV may have a positive refractive power, the fifth lens V may have a negative refractive power, and the sixth lens VI may have a positive refractive power. The third lens III and the fifth lens V may distribute the refractive power of the wide angle lens system.

For example, the first lens I may have an exit surface 2* concave toward the image plane side. For example, the first lens L1 may have an entrance surface 1* convex toward the object side. For example, the first lens I may have a meniscus shape concave toward the image plane side.

For example, the second lens II may have an exit surface 4* convex toward the image plane side. For example, the second lens II may have an entrance surface 3* convex toward the object side. For example, the second lens II may have a biconvex shape. For example, the absolute value of the radius of curvature of the entrance surface 3* of the second lens II may be less than the absolute value of the radius of curvature of the exit surface 4* of the second lens II.

For example, the third lens III may have an exit surface 6* concave toward the image plane side. For example, the third lens III may have an entrance surface 5* convex toward the object side. For example, the third lens III may have a meniscus shape concave toward the image plane side. If the third lens III has a meniscus shape, astigmatic field curves may be effectively corrected.

For example, the fourth lens IV may have an exit surface 8* convex toward the image plane side. For example, the fourth lens IV may have an entrance surface 7* concave toward the object side. For example, the fourth lens IV may have a meniscus shape that is convex toward the image plane side. The fourth lens IV may have an effective diameter larger than those of the first to third lenses Ito III.

For example, the fifth lens V may have an exit surface 10* concave toward the image plane side. For example, at least one of an entrance surface 9* and the exit surface 10* of the fifth lens V may have at least one inflection point. Herein, the term "inflection point" may refer to a point at which the sign of the radius of curvature of a lens surface changes from positive (+) to negative (−), or from negative (−) to positive (+). In addition, the term "reflection point" may refer to a point at which the shape of a lens surface changes from convex to concave, or from concave to convex. For example, the exit surface 10* of the fifth lens V may be concave toward the image plane side in a region adjacent to an optical axis and may then be convex toward the image plane side in a peripheral region away from the optical axis.

For example, at least one of an entrance surface 11* and an exit surface 12* of the sixth lens VI may have at least one inflection point. For example, the sixth lens VI may have a meniscus shape that is convex toward the object side in a center region (in a region within a certain radius from the optical axis). For example, the exit surface 12* of the sixth lens VI may be concave toward the image plane side in a region adjacent to the optical axis and may then be convex toward the image plane side in a peripheral region away from the optical axis. For example, the entrance surface 11* of the sixth lens VI may be convex toward the object side in a region adjacent to the optical axis and may then be concave toward the object side in a peripheral region away from the optical axis. Since the sixth lens VI has an aspherical shape as described above, various aberrations of the wide angle lens system may be effectively corrected.

At least one optical filter VII may be between the sixth lens VI and an image plane IP. For example, the optical filter VII may include at least one of low-pass filters, infrared (IR)-cut filters, and cover glass. For example, if the optical filter VII includes an IR-cut filter, visible light rays may pass through the optical filter VII but infrared rays may not pass through the optical filter VII. Thus, infrared rays may not reach the image plane IP. However, this is a non-limiting example. For example, the wide angle lens system may not include any optical filter.

The aperture stop ST may be provided at a side of the first lens I facing the object side. For example, the aperture stop ST may be closer to the image plane side than a center of the entrance surface 1* of the first lens I (a point at which the entrance surface 1* crosses the optical axis) and may be closer to the object side than a center of the exit surface 2* of the first lens I. Therefore, a center region of the entrance surface 1* of the first lens I may somewhat protrude from the aperture stop ST. This arrangement may be effective in reducing the total length of the wide angle lens system, that is, in reducing the size of the wide angle lens system.

The first to sixth lenses I to VI may be aspherical lenses. For example, at least one of the first to sixth lenses I to VI may be an aspherical lens. For example, all of the first to sixth lenses I to VI may be aspherical lenses. For example, aspherical lenses may be effective in improving the performance of the wide angle lens system and reducing the total length of the wide angle lens system.

At least one of the first to sixth lenses I to VI may include a plastic material. A lens including a plastic material may be lighter than a lens including glass and may easily be produced in a mass production line, compared to a lens including glass. In addition, plastic lenses may incur lower manufacturing costs than glass lenses, and the size of plastic lenses may easily be reduced owing to fewer limitations to formability when compared to glass lenses. For example, in the wide angle lens system of the embodiment, all of the first to sixth lenses I to VI may include a plastic material. Thus, the wide angle lens system may be small and light.

However, materials that may be used to form the first to sixth lenses I to VI are not limited to a plastic material. If necessary, at least one of the first to sixth lenses I to VI may include glass. For example, some of the first to sixth lenses I to VI may include a plastic material, and the others of the first to sixth lenses I to VI may include glass.

The wide angle lens system of the embodiment may have a wide field of view, for example, within the range of about 70° or greater. In addition, the wide angle lens system of the embodiment may have a low F-number that is effective in capturing bright images. For example, the wide angle lens system may have an F-number within the range of about 2.5 or less. The wide angle lens system of the embodiment may have a high degree of wide-angle performance and may have a short total length for being accommodated in a cellular phone.

The wide angle lens system of the embodiment may satisfy at least one of the following Formulas 1 to 7.

$$75 < FOV < 85 \quad \text{Formula 1}$$

where FOV refers to a field of view of the wide angle lens system in degrees (°).

$$2.0 < Fno < 2.3 \quad \text{Formula 2}$$

where Fno refers to an F-number of the wide angle lens system.

If the wide angle lens system satisfies Formulas 1 and 2, the field of view of the wide angle lens system may be sufficiently large, and the F-number of the wide angle lens system may be sufficiently low for capturing bright images.

$$80 < FOV < 82 \quad \text{Formula 1'}$$

where FOV refers to the field of view of the wide angle lens system in degrees (°).

$$2.15 < Fno < 2.25 \quad \text{Formula 2'}$$

where Fno refers to the F-number of the wide angle lens system.

For example, the wide angle lens system may satisfy Formulas 1' and 2'.

$$0.6 < TTL/ImgH < 0.8 \quad \text{Formula 3}$$

where TTL refers to a distance in millimeters (mm) from the entrance surface 1* of the first lens I to the image plane IP, that is, the total length of the wide angle lens system, and ImgH refers to a diagonal length of a maximum pixel region of an image formed on the image plane IP. TTL is measured along the optical axis. For example, TTL may be a straight-line distance from a center region of the entrance surface 1* of the first lens I to a center region of the image plane IP. In addition, ImgH may be a maximum diagonal length of an image formed on the image plane IP.

If the wide angle lens system satisfies Formula 3, the wide angle lens system may have a sufficiently small size and thus may be accommodated in a portable imaging device such as a smartphone. In Formula 3, the more TTL/ImgH approaches the lower limit, the more the wide angle lens system may become compact. However, if TTL/ImgH is less than the lower limit, aberrations of the wide angle lens system such as spherical aberration may increase. That is, it may be difficult to impart a high degree of performance to the wide angle lens system. In Formula 3, the more TTL/ImgH approaches the upper limit, the more effectively the aberration of the wide angle lens system may be corrected. However, if TTL/ImgH is greater than the upper limit, it may be difficult to reduce the size of the wide angle lens system.

$$0.6<TTL/ImgH<0.7 \quad \text{Formula 3'}$$

For example, the wide angle lens system may satisfy Formula 3'.

$$0.5<F/ImgH<0.6 \quad \text{Formula 4}$$

where F refers to an effective focal length of the wide angle lens system in millimeters (mm), and ImgH refers to a diagonal length of an effective pixel region in millimeters (mm).

Formula 4 may be a condition regulating the ratio of the focal length of the wide angle lens system to the image size of the wide angle lens system. If F/ImgH is less than the lower limit in Formula 4, the aberration of the wide angle lens system may not be easily corrected, and if F/ImgH is greater than the upper limit in Formula 4, it may be difficult to optimize the wide angle lens system when the focal length of the wide angle lens system is short.

$$0.3<D1/D6<0.4 \quad \text{Formula 5}$$

where D1 refers to an effective diameter of the first lens I in millimeters (mm and D6 refers to an effective diameter of the sixth lens VI in millimeters (mm).

If the wide angle lens system satisfies Formula 5, the aberration of the wide angle lens system may easily be corrected. In addition, the fourth lens IV may have an effective diameter greater than those of the first to third lenses I to III, and the fifth lens V may have an effective diameter greater than that of the fourth lens IV. In addition, the sixth lens VI may have an effective diameter greater than that of the fifth lens V. In this case, the aberration of the wide angle lens system may easily be corrected.

$$5<f5/f3<15 \quad \text{Formula 6}$$

where f5 refers to a focal length of the fifth lens V and f3 refers to a focal length of the third lens III.

If the wide angle lens system satisfies Formula 6, the refractive power of the wide angle lens system may easily be distributed.

$$1.5<(Ind3+Ind4)/2<1.7 \quad \text{Formula 7}$$

where Ind3 refers to a refractive index of the third lens III and Ind4 refers to a refractive index of the fourth lens IV.

If the wide angle lens system satisfies Formula 7, the wide angle lens system may be formed of a plastic material having a high refractive power, and thus aberration control, aspherical surface formation, and cost reduction may easily be realized.

In the descriptions of the wide angle lens system of the embodiment, the term "aspherical" or "aspherical surface" has the following definition.

$$Z = \frac{Y^2}{R(1 + \sqrt{1 - (1+K)Y^2/R^2})} +$$

$$AY^4 + BY^6 + CY^8 + DY^{10} + EY^{12} +$$

$$FY^{14} + GY^{16} + HY^{18} + JY^{20}$$

⟨Asperical surface equation⟩ where Z denotes a distance measured from the vertex of a lens in the direction of the optical axis of the lens, Y denotes a distance measured from the optical axis in a direction perpendicular to the optical axis, K denotes a conic constant, A, B, C, D, E, F, G, H, and J denote aspherical coefficients, and R denotes a radius of curvature.

Variously designed wide angle lens systems may be provided according to numerical embodiments as described below. In each numerical embodiment, lens surfaces are sequentially numbered in a direction from an object side to an image plane side (1, 2, 3, . . . , n where n is an natural number), and these lens surface numbers are illustrated in the accompanying drawings. In addition, OBJ refers to an object, IP refers to an image plane, R refers to a radius of curvature, D refers to a lens thickness or an air gap between lenses, Nd refers to a refractive index, and Vd refers to an Abbe number. In addition, ST refers to an aperture stop and * refers to an aspherical surface.

<First Numerical Embodiment>

FIG. 1 illustrates the wide angle lens system according to the first numerical embodiment, and design data for the wide angle lens system of the first numerical embodiment are as follows.

TABLE 1

|     | Surface No. | R        | D       | Nd    | Vd     |
|-----|-------------|----------|---------|-------|--------|
|     | ST          | Infinity | −0.1500 |       |        |
| I   | 1*          | 1.7756   | 0.4404  | 1.546 | 56.093 |
|     | 2*          | 2.3073   | 0.0575  |       |        |
| II  | 3*          | 3.0543   | 0.4458  | 1.546 | 56.093 |
|     | 4*          | −12.2949 | 0.0315  |       |        |
| III | 5*          | 6.7924   | 0.2400  | 1.656 | 21.465 |
|     | 6*          | 2.8878   | 0.4672  |       |        |
| IV  | 7*          | −75.0793 | 0.3164  | 1.656 | 21.465 |
|     | 8*          | −49.6989 | 0.3572  |       |        |
| V   | 9*          | 10.4101  | 0.5948  | 1.546 | 56.093 |
|     | 10*         | 7.6242   | 0.2333  |       |        |
| VI  | 11*         | 1.5407   | 0.7258  | 1.546 | 56.093 |
|     | 12*         | 1.2941   | 0.3300  |       |        |
| VII | 13          | Infinity | 0.2100  |       |        |
|     | 14          | Infinity | 0.7200  |       |        |
|     | IP          | Infinity | 0.0000  |       |        |

TABLE 2

| Surfaces | K | A | B | C | D | E | F | G | H | J |
|---|---|---|---|---|---|---|---|---|---|---|
| 1* | −0.6474 | −0.0101 | −0.0218 | 0.1693 | −0.9960 | 2.9863 | −5.1975 | 5.2119 | −2.7896 | 0.6163 |
| 2* | −4.3916 | −0.0372 | −0.2987 | 1.4675 | −6.0858 | 15.2913 | −23.2552 | 21.8073 | −11.5621 | 2.5959 |
| 3* | −9.7064 | −0.0242 | −0.2478 | 0.9634 | −3.2083 | 6.2887 | −6.2879 | 3.0399 | −0.3913 | −0.1704 |
| 4* | 0.0000 | 0.0203 | −0.3500 | 1.3649 | −4.1747 | 9.5134 | −14.4485 | 13.5246 | −7.0311 | 1.5398 |
| 5* | 45.3592 | −0.0074 | −0.3019 | 0.9619 | −2.2282 | 3.0782 | −1.6729 | −1.3973 | 2.4726 | −1.0126 |
| 6* | −10.1890 | 0.0443 | −0.0719 | 0.2380 | −0.6946 | 1.4011 | −1.8253 | 1.5037 | −0.7019 | 0.1418 |
| 7* | 0.0000 | −0.0109 | −0.1483 | 0.2493 | −0.0478 | −0.3973 | 0.6617 | −0.5108 | 0.2014 | −0.0329 |
| 8* | 0.0000 | 0.0292 | −0.2429 | 0.3631 | −0.3076 | 0.1699 | −0.0556 | 0.0078 | 0.0003 | −0.0001 |
| 9* | 0.0000 | 0.1354 | −0.1997 | 0.1604 | −0.1176 | 0.0652 | −0.0237 | 0.0051 | −0.0006 | 2.4578e−005 |
| 10* | 0.0000 | −0.0883 | 0.2353 | −0.2753 | 0.1769 | −0.0724 | 0.0194 | −0.0033 | 0.0003 | −1.4192e−005 |
| 11* | −7.0318 | −0.1500 | 0.0673 | −0.0043 | −0.0150 | 0.0081 | −0.0020 | 0.0003 | −1.6733e−005 | 4.5655e−007 |
| 12* | −3.7749 | −0.1095 | 0.0520 | −0.0176 | 0.0036 | −0.0005 | 4.7608e−005 | −4.2221e−006 | 2.7074e−007 | −7.9675e−009 |

Figure 2:
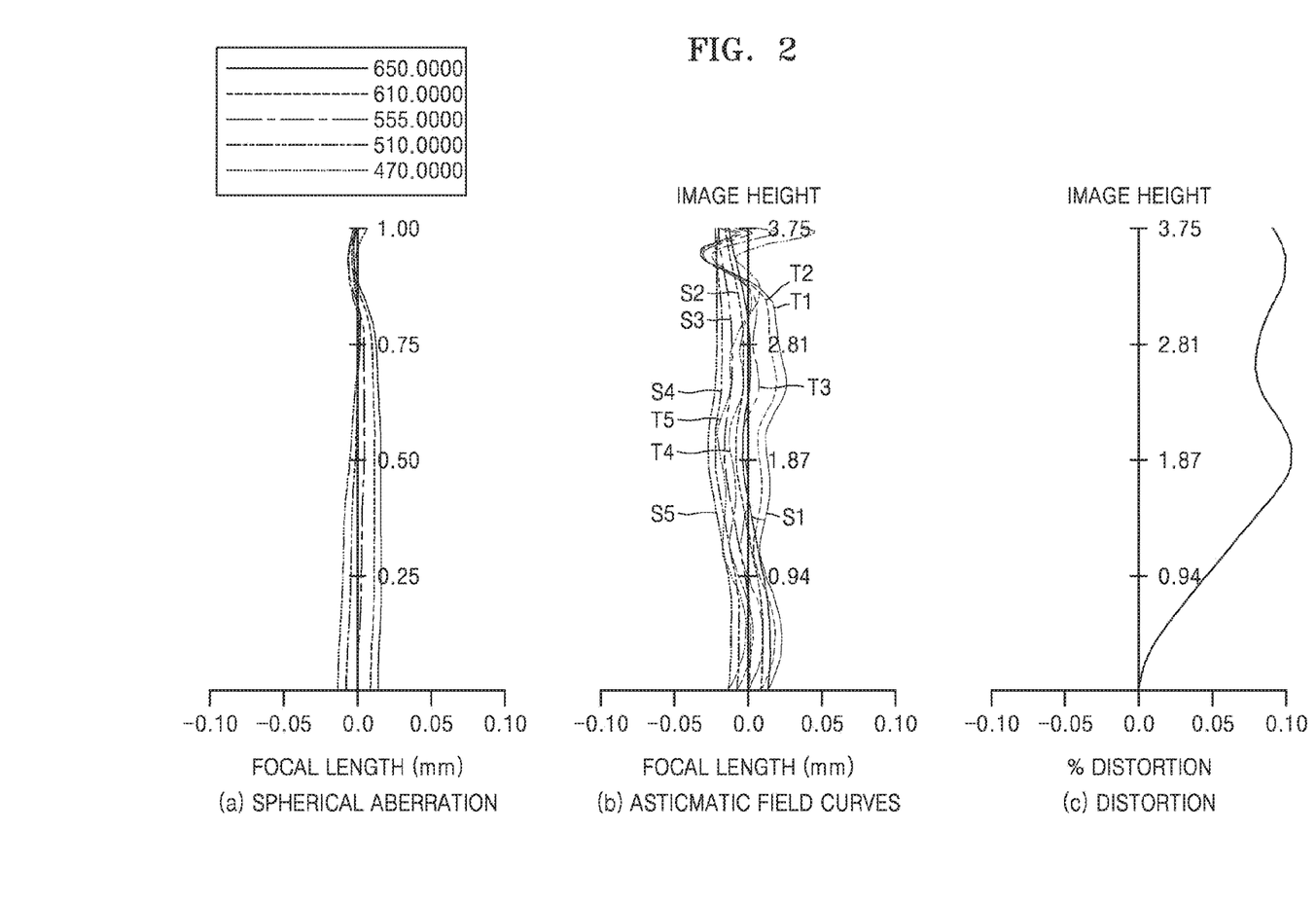
FIG. 2 illustrates spherical aberration, astigmatic field curves, and distortion of the wide angle lens system of the first numerical embodiment.

FIG. 2 illustrates longitudinal spherical aberration, astigmatic field curves, and distortion of the wide angle lens system of the first numerical embodiment. The astigmatic field curves include a tangential field curvature T and a sagittal field curvature S.

<Second Numerical Embodiment>

Figure 3:
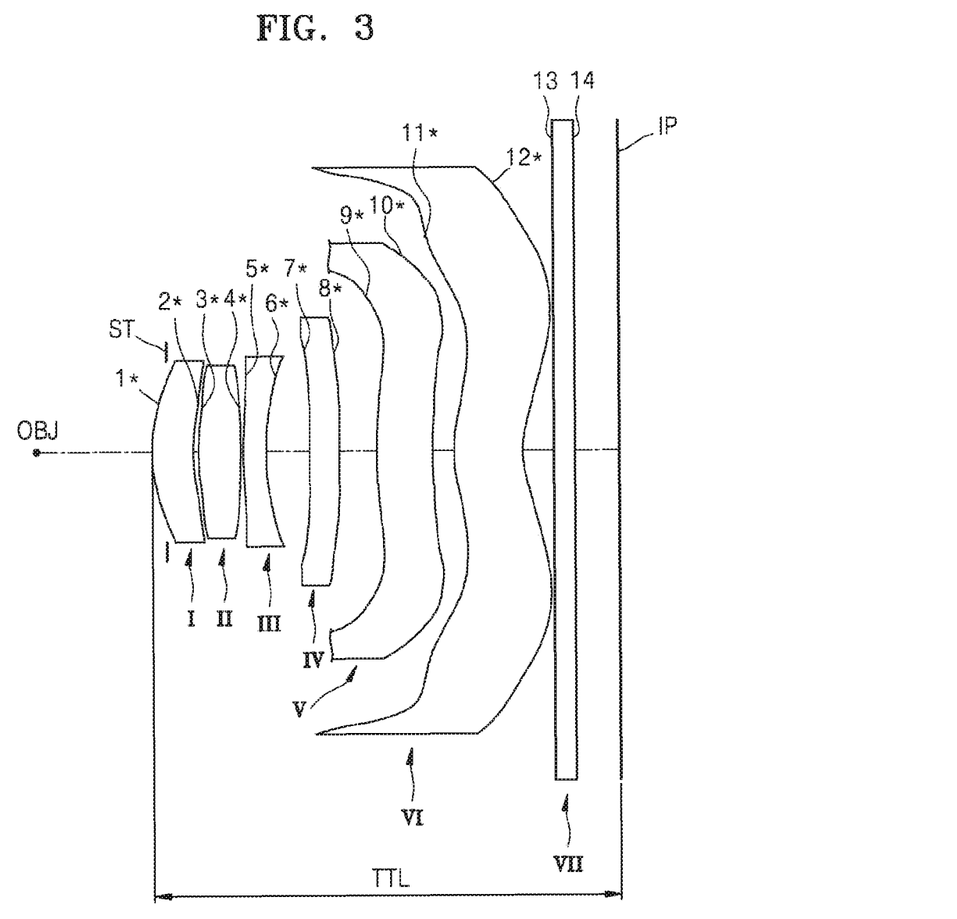
FIG. 3 is a schematic cross-sectional view illustrating an arrangement of elements of a wide angle lens system according to a second numerical embodiment.

FIG. 3 illustrates a wide angle lens system according to a second numerical embodiment, and design data for the wide angle lens system of the second numerical embodiment are as follows.

Figure 4:
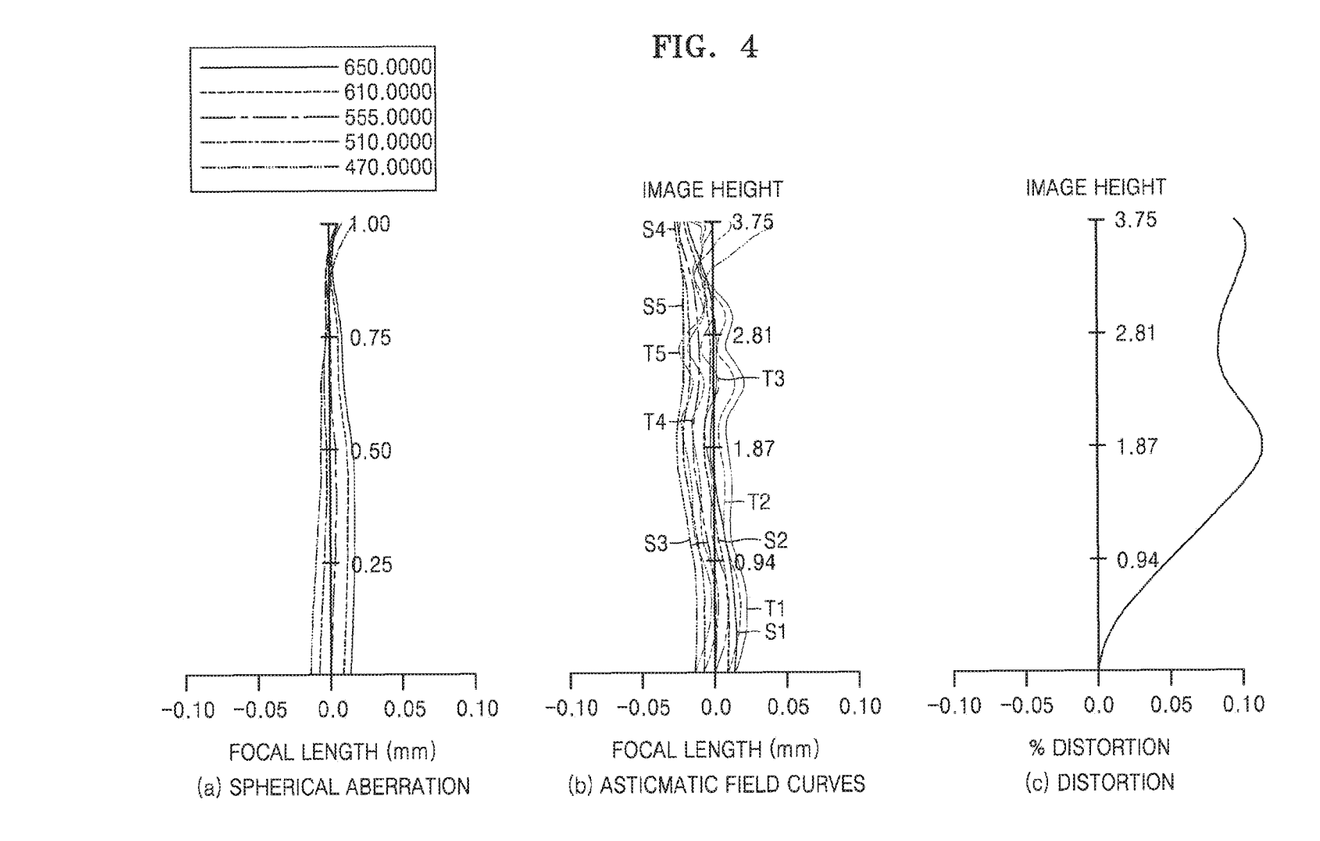
FIG. 4 illustrates spherical aberration, astigmatic field curves, and distortion of the wide angle lens system of the second numerical embodiment.

FIG. 4 illustrates longitudinal spherical aberration, astigmatic field curves, and distortion of the wide angle lens system of the second numerical embodiment. The astigmatic field curves include a tangential field curvature T and a sagittal field curvature S.

<Third Numerical Embodiment>

Figure 5:
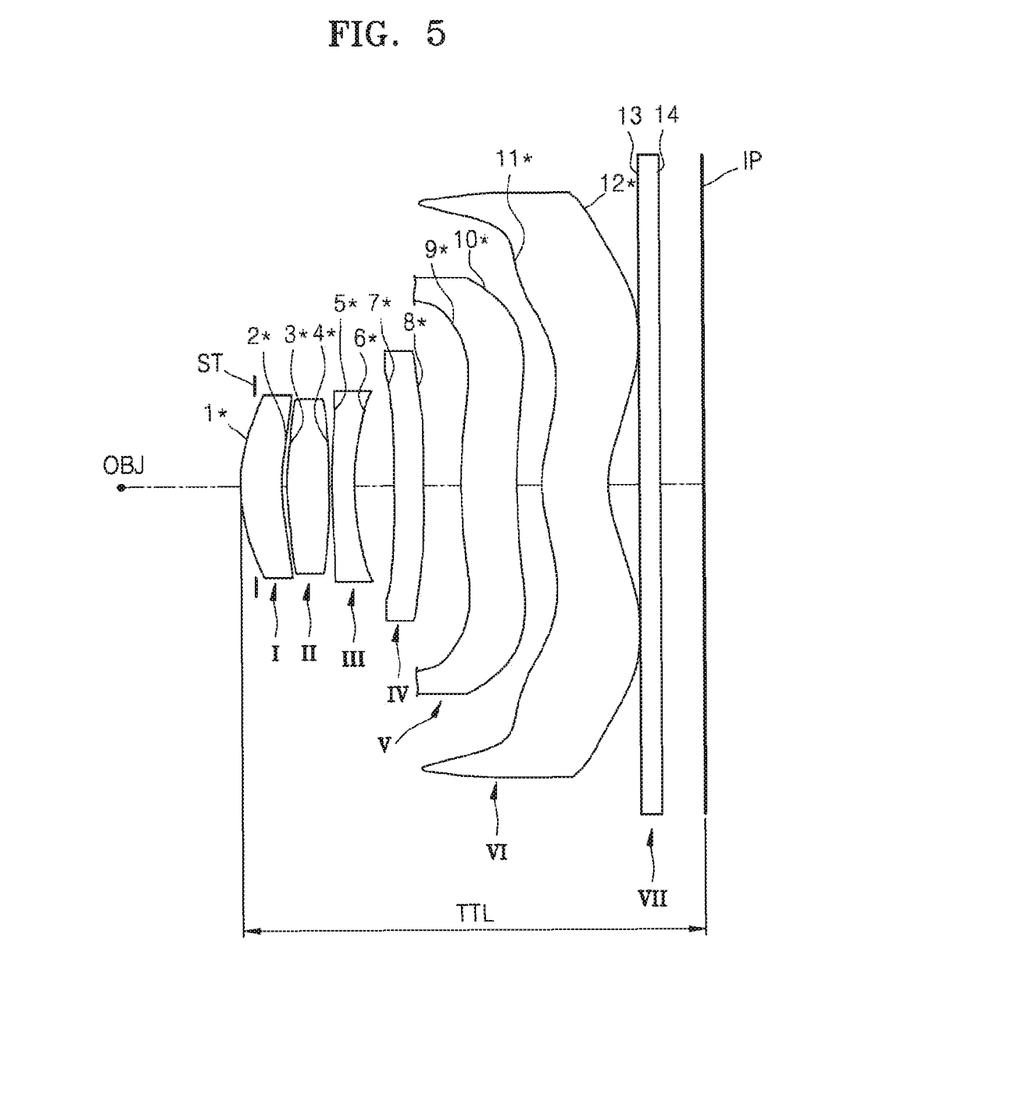
FIG. 5 is a schematic cross-sectional view illustrating an arrangement of elements of a wide angle lens system according to a third numerical embodiment.

FIG. 5 illustrates a wide angle lens system according to a third numerical embodiment, and design data for the wide angle lens system of the third numerical embodiment are as follows.

TABLE 3

| | Surface No. | R | D | Nd | Vd |
|---|---|---|---|---|---|
| | ST | Infinity | −0.1500 | | |
| I | 1* | 1.7727 | 0.4494 | 1.546 | 56.093 |
| | 2* | 2.4448 | 0.0489 | | |
| II | 3* | 3.3097 | 0.4598 | 1.546 | 56.093 |
| | 4* | −12.0902 | 0.0300 | | |
| III | 5* | 6.8698 | 0.2400 | 1.656 | 21.465 |
| | 6* | 2.8808 | 0.4505 | | |
| IV | 7* | −50.2925 | 0.3202 | 1.656 | 21.465 |
| | 8* | −28.6158 | 0.3697 | | |
| V | 9* | 10.5233 | 0.6031 | 1.546 | 56.093 |
| | 10* | 6.9911 | 0.2251 | | |
| VI | 11* | 1.5591 | 0.7233 | 1.546 | 56.093 |
| | 12* | 1.3219 | 0.3200 | | |
| VII | 13 | Infinity | 0.2100 | | |
| | 14 | Infinity | 0.7200 | | |
| | IP | Infinity | 0.0000 | | |

TABLE 5

| | Surface No. | R | D | Nd | Vd |
|---|---|---|---|---|---|
| | ST | Infinity | −0.1500 | | |
| I | 1* | 1.7886 | 0.4076 | 1.546 | 56.093 |
| | 2* | 2.2875 | 0.0506 | | |
| II | 3* | 2.9812 | 0.4535 | 1.546 | 56.093 |
| | 4* | −12.0753 | 0.0300 | | |
| III | 5* | 6.8711 | 0.2400 | 1.656 | 21.465 |
| | 6* | 2.8029 | 0.4486 | | |
| IV | 7* | −56.3000 | 0.2990 | 1.656 | 21.465 |
| | 8* | −32.4897 | 0.4000 | | |
| V | 9* | 10.7498 | 0.6067 | 1.546 | 56.093 |
| | 10* | 8.3894 | 0.2655 | | |
| VI | 11* | 1.4130 | 0.7085 | 1.546 | 56.093 |
| | 12* | 1.1835 | 0.3300 | | |
| VII | 13 | Infinity | 0.2100 | | |
| | 14 | Infinity | 0.7180 | | |
| | IP | Infinity | 0.0020 | | |

TABLE 4

| Surfaces | K | A | B | C | D | E | F | G | H | J |
|---|---|---|---|---|---|---|---|---|---|---|
| 1* | −0.6120 | −0.0081 | −0.0099 | 0.0073 | −0.0950 | 0.2674 | −0.3954 | 0.2336 | 0.0151 | −0.0460 |
| 2* | −4.1625 | −0.0391 | −0.2367 | 0.9589 | −4.0309 | 10.1767 | −15.2267 | 14.0880 | −7.3681 | 1.5993 |
| 3* | −9.8056 | −0.0252 | −0.2033 | 0.6674 | −2.0562 | 3.3684 | −1.5036 | −1.8329 | 2.4573 | −0.9049 |
| 4* | 0.0000 | 0.0009 | −0.2438 | 1.1521 | −3.9780 | 9.4522 | −14.4691 | 13.4578 | −6.8702 | 1.4571 |
| 5* | 45.1543 | −0.0310 | −0.2286 | 0.8932 | −2.4757 | 4.1254 | −3.7518 | 1.0546 | 0.8811 | −0.5756 |
| 6* | −10.4026 | 0.0405 | −0.0803 | 0.3016 | −0.8203 | 1.4776 | −1.7427 | 1.3258 | −0.5803 | 0.1109 |
| 7* | 0.0000 | −0.0240 | −0.0637 | −0.0554 | 0.6188 | −1.3521 | 1.5671 | −1.0601 | 0.3947 | −0.0631 |
| 8* | 0.0000 | 0.0152 | −0.1666 | 0.1601 | 0.0120 | −0.1505 | 0.1520 | −0.0760 | 0.0194 | −0.0020 |
| 9* | 0.0000 | 0.1283 | −0.1667 | 0.0961 | −0.0460 | 0.0144 | 0.0001 | −0.0021 | 0.0007 | −7.1717e−005 |
| 10* | 0.0000 | −0.0845 | 0.2435 | −0.2985 | 0.2003 | −0.0852 | 0.0235 | −0.0041 | 0.0004 | −1.7995e−005 |
| 11* | −6.9269 | −0.1468 | 0.0715 | −0.0137 | −0.0083 | 0.0057 | −0.0014 | 0.0002 | −1.2650e−005 | 3.4600e−007 |
| 12* | −3.7167 | −0.1082 | 0.0509 | −0.0176 | 0.0038 | −0.0005 | 5.9583e−005 | −5.4885e−006 | 3.4093e−007 | −9.5697e−009 |

TABLE 6

| Surfaces | K | A | B | C | D | E | F | G | H | J |
|---|---|---|---|---|---|---|---|---|---|---|
| 1* | −0.6685 | −0.0076 | −0.0625 | 0.4081 | −1.8271 | 4.7926 | −7.7225 | 7.4231 | −3.8931 | 0.8552 |
| 2* | −4.2065 | −0.0472 | −0.2742 | 1.3839 | −5.9644 | 15.5061 | −24.3788 | 23.8524 | −13.3885 | 3.2400 |
| 3* | −9.6158 | −0.0233 | −0.3056 | 1.5292 | −6.0383 | 14.6632 | −21.3000 | 19.2681 | −10.1947 | 2.3773 |
| 4* | 0.0000 | −0.0307 | −0.0149 | 0.0548 | −0.2267 | 0.7811 | −1.5280 | 1.6602 | −0.9755 | 0.2413 |
| 5* | 45.1637 | −0.0693 | 0.0786 | −0.6452 | 3.0636 | −9.1504 | 16.5685 | −17.8810 | 10.6005 | −2.6648 |
| 6* | −10.4324 | 0.0302 | −0.0321 | 0.2207 | −0.9162 | 2.3055 | −3.6528 | 3.5581 | −1.9205 | 0.4398 |
| 7* | 0.0000 | −0.0361 | −0.0614 | −0.0479 | 0.6330 | −1.4454 | 1.7584 | −1.2628 | 0.5051 | −0.0876 |
| 8* | 0.0000 | 0.0008 | −0.1448 | 0.1413 | 0.0151 | −0.1284 | 0.1192 | −0.0546 | 0.0126 | −0.0012 |
| 9* | 0.0000 | 0.1156 | −0.1309 | 0.0688 | −0.0364 | 0.0173 | −0.0045 | 6.1321e−005 | 0.0002 | −2.9723e−005 |
| 10* | 0.0000 | −0.1132 | 0.2919 | −0.3358 | 0.2170 | −0.0895 | 0.0241 | −0.0041 | 0.0004 | −1.7585e−005 |
| 11* | −6.4679 | −0.1468 | 0.0715 | −0.0137 | −0.0083 | 0.0057 | −0.0014 | 0.0002 | −1.2650e−005 | 3.4602e−007 |
| 12* | −3.6389 | −0.1096 | 0.0569 | −0.0223 | 0.0058 | −0.0011 | 0.0001 | −1.2326e−005 | 6.3599e−007 | −1.4391e−008 |

Figure 6:
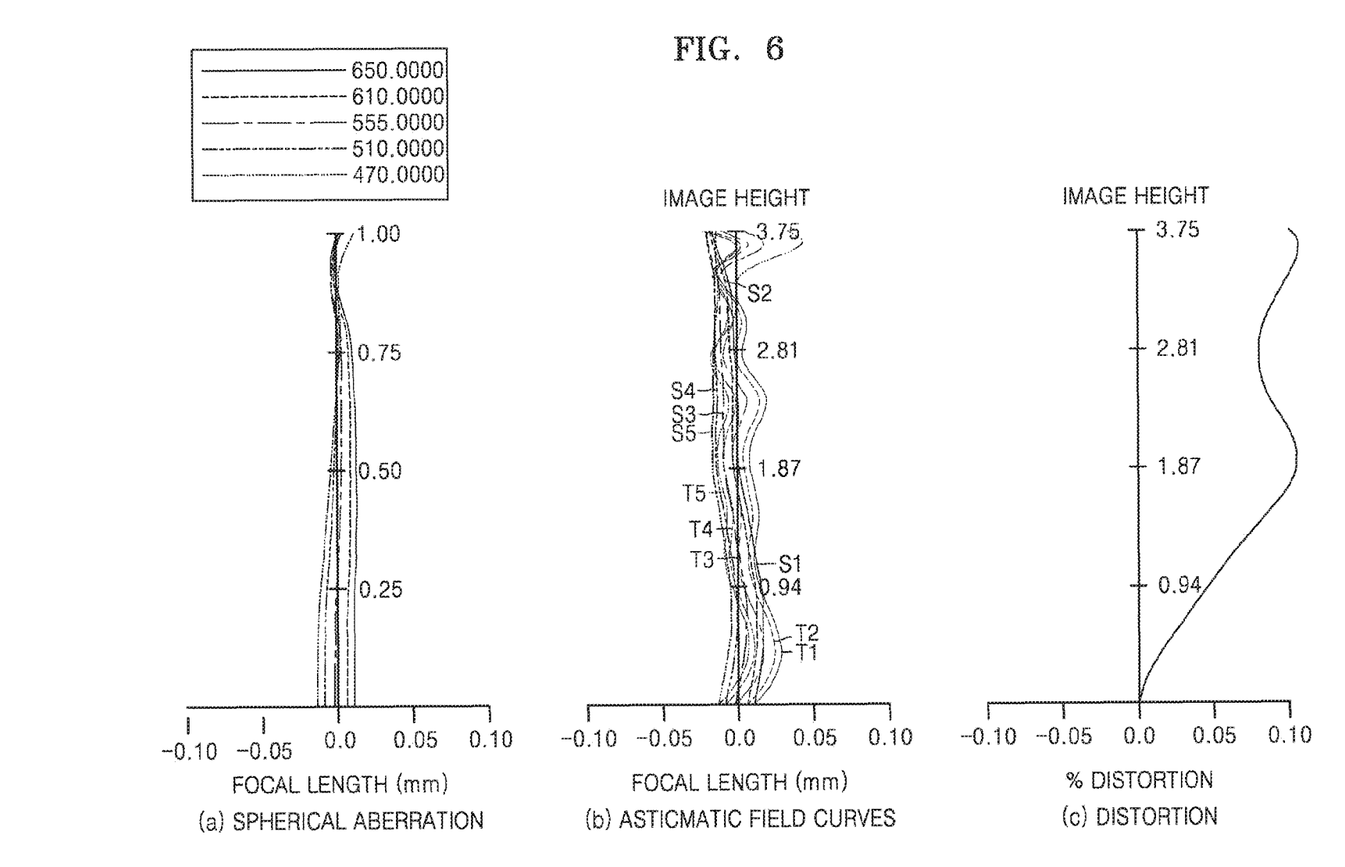
FIG. 6 illustrates spherical aberration, astigmatic field curves, and distortion of the wide angle lens system of the third numerical embodiment.

FIG. 6 illustrates longitudinal spherical aberration, astigmatic field curves, and distortion of the wide angle lens system of the third numerical embodiment. The astigmatic field curves include a tangential field curvature T and a sagittal field curvature S.

<Fourth Numerical Embodiment>

Figure 7:
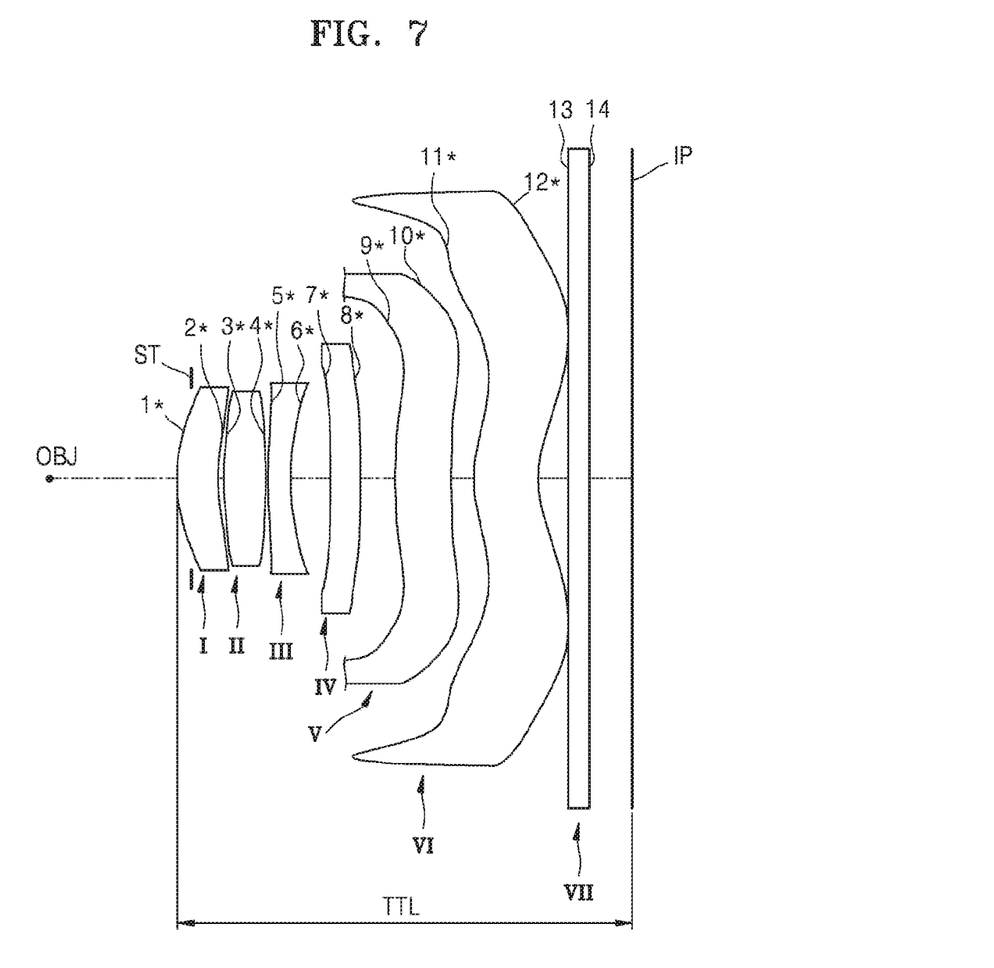
FIG. 7 is a schematic cross-sectional view illustrating an arrangement of elements of a wide angle lens system according to a fourth numerical embodiment.

FIG. 7 illustrates a wide angle lens system according to a fourth numerical embodiment, and design data for the wide angle lens system of the fourth numerical embodiment are as follows.

TABLE 7

| | Surface No. | R | D | Nd | Vd |
|---|---|---|---|---|---|
| | ST | Infinity | −0.1500 | | |
| I | 1* | 1.7971 | 0.4253 | 1.546 | 56.093 |
| | 2* | 2.2397 | 0.0468 | | |
| II | 3* | 2.8795 | 0.4760 | 1.546 | 56.093 |
| | 4* | −12.0462 | 0.0300 | | |
| III | 5* | 6.8852 | 0.2400 | 1.656 | 21.465 |
| | 6* | 2.8074 | 0.4247 | | |
| IV | 7* | −81.4710 | 0.3161 | 1.656 | 21.465 |
| | 8* | −40.7907 | 0.3964 | | |
| V | 9* | 10.7644 | 0.6062 | 1.546 | 56.093 |
| | 10* | 8.4433 | 0.2449 | | |
| VI | 11* | 1.4261 | 0.7037 | 1.546 | 56.093 |
| | 12* | 1.2019 | 0.3300 | | |
| VII | 13 | Infinity | 0.2100 | | |
| | 14 | Infinity | 0.7206 | | |
| | IP | Infinity | −0.0006 | | |

TABLE 8

| Surfaces | K | A | B | C | D | E | F | G | H | J |
|---|---|---|---|---|---|---|---|---|---|---|
| 1* | −0.6607 | −0.0050 | −0.1001 | 0.6777 | −2.9453 | 7.6870 | −12.4019 | 12.0195 | −6.3976 | 1.4346 |
| 2* | −4.1897 | −0.0469 | −0.2877 | 1.5227 | −6.9627 | 19.1005 | −31.3647 | 31.4144 | −17.6611 | 4.2133 |
| 3* | −9.6686 | −0.0174 | −0.3443 | 1.7699 | −7.2601 | 18.3864 | −27.8972 | 25.9316 | −13.7111 | 3.1150 |
| 4* | 0.0000 | −0.0349 | 0.0477 | −0.3920 | 1.6326 | −3.8969 | 5.7298 | −5.2115 | 2.7047 | −0.6190 |
| 5* | 45.1410 | −0.0753 | 0.1424 | −1.0429 | 4.5955 | −12.7638 | 21.8099 | −22.4795 | 12.8650 | −3.1503 |
| 6* | −10.4125 | 0.0266 | −0.0148 | 0.1655 | −0.7856 | 2.1114 | −3.5006 | 3.5060 | −1.9134 | 0.4369 |
| 7* | 0.0000 | −0.0374 | −0.0725 | 0.0620 | 0.2718 | −0.7910 | 1.0537 | −0.8172 | 0.3526 | −0.0660 |
| 8* | 0.0000 | −0.0026 | −0.1368 | 0.1425 | −0.0236 | −0.0526 | 0.0490 | −0.0197 | 0.0036 | −0.0002 |
| 9* | 0.0000 | 0.1190 | −0.1303 | 0.0566 | −0.0215 | 0.0083 | −0.0014 | −0.0006 | 0.0003 | −3.3502e−005 |
| 10* | 0.0000 | −0.1086 | 0.2958 | −0.3492 | 0.2301 | −0.0965 | 0.0263 | −0.0046 | 0.0005 | −1.9665e−005 |
| 11* | −6.4363 | −0.1467 | 0.0715 | −0.0137 | −0.0083 | 0.0057 | −0.0014 | 0.0002 | −1.2650e−005 | 3.4602e−007 |
| 12* | −3.6315 | −0.1078 | 0.0534 | −0.0199 | 0.0049 | −0.0008 | 0.0001 | −9.2792e−006 | 4.9286e−007 | −1.1614e−008 |

Figure 8:
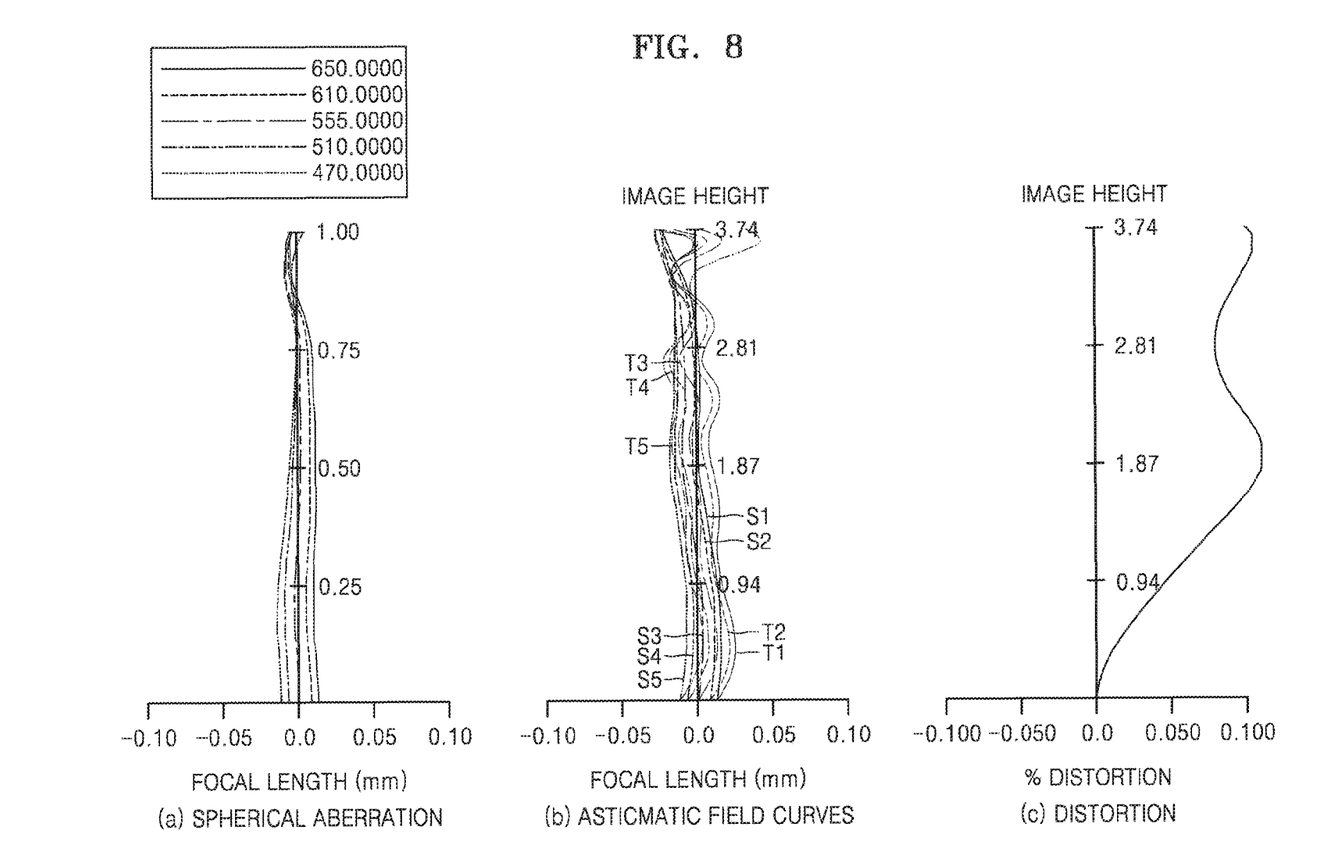
FIG. 8 illustrates spherical aberration, astigmatic field curves, and distortion of the wide angle lens system of the fourth numerical embodiment.

FIG. 8 illustrates longitudinal spherical aberration, astigmatic field curves, and distortion of the wide angle lens system of the fourth numerical embodiment. The astigmatic field curves include a tangential field curvature T and a sagittal field curvature S.

Table 9 below shows that the wide angle lens systems of the first to fourth numerical embodiments satisfy Formulas 1 to 7. In Table 9, FOV denotes a field of view in degrees (°). In Table 10, FOV is in degrees (°), and TTL, ImgH, F, D1, D6, f5, and f3 are in millimeters (mm).

TABLE 9

| No. | Formula | First Embodiment | Second Embodiment | Third Embodiment | Fourth Embodiment |
|---|---|---|---|---|---|
| Formula 1 | 75 < FOV < 85 | 81.115 | 81.071 | 81.533 | 81.618 |
| Formula 2 | 2.0 < Fno < 2.3 | 2.200 | 2.200 | 2.200 | 2.200 |
| Formula 3 | 0.6 < TTL/ImgH < 0.8 | 0.689885 | 0.689885 | 0.689885 | 0.690622 |

TABLE 9-continued

| No. | Formula | First Embodiment | Second Embodiment | Third Embodiment | Fourth Embodiment |
|---|---|---|---|---|---|
| Formula 4 | 0.5 < F/ImgH < 0.6 | 0.573792 | 0.573792 | 0.568361 | 0.567726 |
| Formula 5 | 0.3 < D1/D6 < 0.4 | 0.332405 | 0.3288 | 0.327926 | 0.328506 |
| Formula 6 | 5 < f5/f3 < 15 | 7.18777 | 5.238406 | 10.41268 | 10.67617 |
| Formula 7 | 1.5 < (Ind3 + Ind4)/2 < 1.7 | 1.655738 | 1.655738 | 1.655738 | 1.655738 |

TABLE 10

| | First Embodiment | Second Embodiment | Third Embodiment | Fourth Embodiment |
|---|---|---|---|---|
| FOV | 81.115 | 81.071 | 81.533 | 81.618 |
| Fno | 2.200 | 2.200 | 2.200 | 2.200 |
| TTL | 5.170 | 5.170 | 5.170 | 5.170 |
| ImgH | 7.494 | 7.494 | 7.494 | 7.486 |
| F | 4.3000 | 4.3000 | 4.2593 | 4.2500 |
| D1 | 1.956 | 1.973 | 1.953 | 1.958 |
| D6 | 5.886 | 6.000 | 5.954 | 5.960 |
| f5 | −56.440 | −40.601 | −76.972 | −79.015 |
| f3 | −7.852 | −7.751 | −7.392 | −7.401 |
| Ind3 | 1.656 | 1.656 | 1.656 | 1.656 |
| Ind4 | 1.656 | 1.656 | 1.656 | 1.656 |

Figure 9:
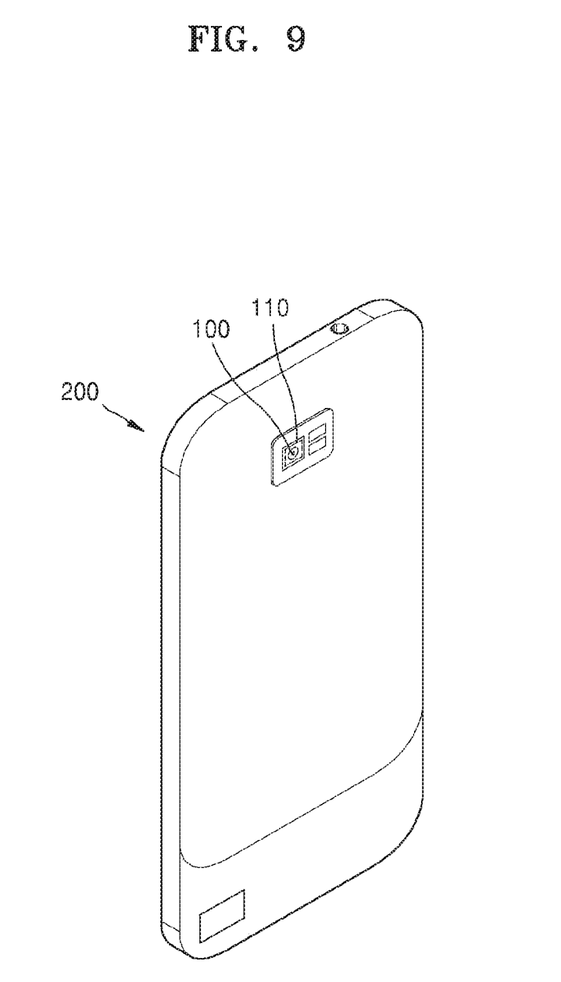
FIG. 9 is a schematic perspective view illustrating an imaging device including a wide angle lens system according to an embodiment.

FIG. 9 is a view illustrating an imaging device 200 including a wide angle lens system 100 according to an embodiment. The imaging device 200 may include: the wide angle lens system 100; and an image sensor 110 configured to convert images formed by the wide angle lens system 100 into electric image signals. The wide angle lens system 100 may be any one of the wide angle lens systems described with reference to FIGS. 1 to 8. As illustrated in FIG. 9, any one of the wide angle lens systems of the embodiments may be applied to an imaging device such as a small digital camera, a mobile phone camera, or an automotive camera. In this manner, an imaging device having a wide field of view and a low F-number may be provided for photographing.

The imaging device 200 illustrated in FIG. 9 is an example. That is, the inventive concept may be applied to various optical devices. For example, the wide angle lens systems of the embodiments may be used as lens systems of automotive cameras. In addition, the wide angle lens systems of the embodiments may be applied to devices such as virtual reality devices or augmented reality devices. For example, the wide angle lens systems of the embodiments may be oriented in opposite directions in a virtual reality device. For example, the wide angle lens systems of the embodiments may be applied to various automotive devices such as black boxes, around view monitoring (AVM) systems, or rear cameras. In addition, the wide angle lens systems of the embodiments may be applied to various action camera devices such as drones or camcorders for leisure or sports activities. In addition, the wide angle lens systems of the embodiments may be applied to various surveillance cameras.

The wide angle lens systems of the embodiments may have a wide field of view, for example, within the range of about 70° or greater. In addition, the wide angle lens systems of the embodiments may have a low F-number that is effective in capturing bright images. For example, the wide angle lens systems may have an F-number within the range of about 2.5 or less. The wide angle lens systems of the embodiments may have a high degree of wide-angle performance and may have a short total length for being accommodated in a cellular phone.

Although many specific features have been described, these features should be considered in a descriptive sense only and not for purposes of limitation. That is, such features should be considered as examples according to embodiments. For example, it will be apparent to those of ordinary skill in the art that although the shapes of the lenses of the wide angle lens systems of the embodiments are modified to some degree, the above-described effects may be obtained if the wide angle lens systems satisfy at least one of Formulas 1 to 7. In addition, although the wide angle lens systems of the embodiments do not satisfy some of Formulas 1 to 7, if the distribution of the refractive powers of the lenses, the structural conditions of the lenses, and other conditions are satisfied, the above-described effects may be obtained. Other various embodiments may be provided. Thus, the scope and spirit of the inventive concept are defined not by the descriptions of the embodiments but by the appended claims.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope of the inventive concept as defined by the following claims.

What is claimed is:

1. A wide angle lens system, from an object side to an image plane side, comprising:
 a first lens having a positive refractive power;
 a second lens having a positive refractive power and an exit surface that is convex toward the image plane side;
 a third lens having a negative refractive power and an exit surface that is concave toward the image plane side;
 a fourth lens having a positive refractive power and an exit surface that is convex toward the image plane side;
 a fifth lens having a negative refractive power and an exit surface that is concave toward the image plane side; and
 a sixth lens having a positive refractive power,
 wherein the wide angle lens system satisfies Formulas 1, 2, and 3 below:

$$75 < FOV < 85 \quad \text{Formula 1}$$

$$2.0 < Fno < 2.3 \quad \text{Formula 2}$$

$$0.6 < TTL/ImgH < 0.8 \quad \text{Formula 3}$$

where FOV refers to a field of view of the wide angle lens system in degrees(°) and Fno refers to an F-number of the wide angle lens system, and TTL refers to a distance in millimeters (mm) from a center of an entrance surface of the first lens to an image plane, and ImgH refers to a diagonal length of an effective pixel region in millimeters (mm).

2. The wide angle lens system of claim 1, wherein the fourth lens has a meniscus shape that is convex toward the image plane side.

3. The wide angle lens system of claim 1, wherein at least one of an entrance surface and an exit surface of the sixth lens has at least one inflection point.

4. The wide angle lens system of claim 1, wherein the wide angle lens system satisfies Formula 4 below:

$$0.5 < F/\text{ImgH} < 0.6 \quad \text{Formula 4}$$

where F refers to an effective focal length of the wide angle lens system in millimeters (mm), and ImgH refers to a diagonal length of an effective pixel region in millimeters (mm).

5. The wide angle lens system of claim 1, wherein the wide angle lens system satisfies Formula 5 below:

$$0.3 < D1/D6 < 0.4 \quad \text{Formula 5}$$

where D1 refers to an effective diameter of the first lens in millimeters (mm) and D6 refers to an effective diameter of the sixth lens in millimeters (mm).

6. The wide angle lens system of claim 1, wherein the wide angle lens system satisfies Formula 6 below:

$$5 < f5/f3 < 15 \quad \text{Formula 6}$$

where f5 refers to a focal length of the fifth lens in millimeters (mm) and f3 refers to a focal length of the third lens in millimeters (mm).

7. The wide angle lens system of claim 1, wherein the wide angle lens system satisfies Formula 7 below:

$$1.5 < (\text{Ind3} + \text{Ind4})/2 < 1.7 \quad \text{Formula 7}$$

where Ind3 refers to a refractive index of the third lens and Ind4 refers to a refractive index of the fourth lens.

8. The wide angle lens system of claim 1, wherein the first lens comprises a meniscus lens that is concave toward the image plane side.

9. The wide angle lens system of claim 1, wherein the second lens comprises a biconvex lens, and
an absolute value of a radius of curvature of an entrance surface of the second lens is less than an absolute value of a radius of curvature of the exit surface of the second lens.

10. The wide angle lens system of claim 1, further comprising an aperture stop at a side of the first lens facing the object side.

11. The wide angle lens system of claim 1, further comprising an optical filter provided at a side of the sixth lens facing the image plane side.

12. The wide angle lens system of claim 1, wherein the first to sixth lenses are aspherical lenses.

13. The wide angle lens system of claim 1, wherein the first to sixth lenses are plastic lenses.

14. An imaging device comprising:
the wide angle lens system of claims 1; and
a solid-state imaging element configured to pick up an image formed by the wide angle lens system.

15. A wide angle lens system, from an object side to an image plane side, comprising:
a first lens having a positive refractive power and an exit surface that is concave toward the image plane side;
a second lens having a positive refractive power and an exit surface that is convex toward the image plane side;
a third lens having a negative refractive power and an exit surface that is concave toward the image plane side;
a fourth lens having a positive refractive power, the fourth lens being an meniscus lens having an exit surface that is convex toward the image plane side;
a fifth lens having a negative refractive power and an exit surface that is concave toward the image plane side; and
a sixth lens having a positive refractive power and an exit surface with at least one inflection point,
wherein the wide angle lens system satisfies Formula 1 below:

$$0.6 < \text{TTL}/\text{ImgH} < 0.8 \quad \text{Formula 1}$$

where TTL refers to a distance in millimeters (mm) from a center of an entrance surface of the first lens to an image plane, and ImgH refers to a diagonal length of an effective pixel region in millimeters (mm).

16. The wide angle lens system of claim 15, further comprising an aperture stop at a side of the first lens facing the object side.

17. The wide angle lens system of claim 15, wherein the wide angle lens system satisfies Formulas 2 and 3 below:

$$75 < \text{FOV} < 85 \quad \text{Formula 2}$$

$$2.0 < \text{Fno} < 2.3 \quad \text{Formula 3}$$

where FOV refers to a field of view of the wide angle lens system in degrees (°) and Fno refers to an F-number of the wide angle lens system.

18. The wide angle lens system of claim 15, wherein the wide angle lens system satisfies at least one of Formulas 4 to 7 below:

$$0.5 < F/\text{ImgH} < 0.6 \quad \text{Formula 4}$$

$$0.3 < D1/D6 < 0.4 \quad \text{Formula 5}$$

$$5 < f5/f3 < 15 \quad \text{Formula 6}$$

$$1.5 < (\text{Ind3 30 Ind4})/2 < 1.7 \quad \text{Formula 7}$$

where F refers to an effective focal length of the wide angle lens system in millimeters (mm), D1 refers to an effective diameter of the first lens in millimeters (mm), D6 refers to an effective diameter of the sixth lens in millimeters (mm), f5 refers to a focal length of the fifth lens, f3 refers to a focal length of the third lens, Ind3 refers to a refractive index of the third lens, and Ind4 refers to a refractive index of the fourth lens.

19. The wide angle lens system of claim 15, wherein the first lens comprises a meniscus lens that is concave toward the image plane side.

* * * * *